United States Patent [19]
Wurst

[11] 3,855,956
[45] Dec. 24, 1974

[54] SEWING MACHINE STITCH PATTERN GENERATION FROM STITCH DATA STORED IN STATIC MEMORY

[75] Inventor: John W. Wurst, Dover, N.J.
[73] Assignee: The Singer Company, New York, N.Y.
[22] Filed: July 5, 1973
[21] Appl. No.: 376,780

[52] U.S. Cl............................................ 112/158 E
[51] Int. Cl............................................. D05b 3/02
[58] Field of Search...... 112/121.11, 121.12, 158 R, 112/158 A, 158 B, 158 E; 66/50 R

[56] References Cited
UNITED STATES PATENTS
3,005,136  10/1961  Flückiger.................... 112/158 E X
3,076,066  1/1963   Caron.......................... 112/158 E X FOREIGN PATENTS OR APPLICATIONS
1,273,661  5/1972  Great Britain...................... 66/50 R Primary Examiner—Werner H. Schroeder
Attorney, Agent, or Firm—Marshall J. Breen; Robert E. Smith; Edward L. Bell

[57] ABSTRACT

A system is disclosed wherein digital information related to the positional coordinates for each stitch of a predetermined stitch pattern is stored in a static memory. A pulse generator driven in timed relation with the sewing machine produces a timing signal pulse between each successive stitch. These signal pulses are counted up in a counter to provide a time series of progressively increasing binary numbers corresponding to the progressively increasing number of stitches in the pattern. The counter output is applied as the address to the memory to recover as output therefrom the digital information related to the positional coordinates for each stitch of the predetermined pattern. The memory output is applied to a control driving device operatively connected to impart a controlled range of movement to the conventional stitch forming instrumentality of the sewing machine to produce a specific predetermined position coordinate for the needle penetration during each stitch formation.

8 Claims, 8 Drawing Figures

ENCODED DATA FOR ARROWHEAD PATTERN

| STITCH NO. | POSITION COORDINATE | CODE |
|---|---|---|
| 1 | 0 | 0 1 1 1 1 |
| 2 | -15 | 0 0 0 0 0 |
| 3 | +15 | 1 1 1 1 0 |
| 4 | -14 | 0 0 0 0 1 |
| 5 | +14 | 1 1 1 0 1 |
| 6 | -13 | 0 0 0 1 0 |
| 7 | +13 | 1 1 1 0 0 |
| 8 | -12 | 0 0 0 1 1 |
| 9 | +12 | 1 1 0 1 1 |
| 10 | -11 | 0 0 1 0 0 |
| 11 | +11 | 1 1 0 1 0 |
| 12 | -10 | 0 0 1 0 1 |
| 13 | +10 | 1 1 0 0 1 |
| 14 | -9 | 0 0 1 1 0 |
| 15 | +9 | 1 1 0 0 0 |
| 16 | -8 | 0 0 1 1 1 |
| 17 | +8 | 1 0 1 1 1 |
| 18 | -7 | 0 1 0 0 0 |
| 19 | +7 | 1 0 1 1 0 |
| 20 | -6 | 0 1 0 0 1 |
| 21 | +6 | 1 0 1 0 1 |
| 22 | -5 | 0 1 0 1 0 |
| 23 | +5 | 1 0 1 0 0 |
| 24 | -4 | 0 1 0 1 1 |
| 25 | +4 | 1 0 0 1 1 |
| 26 | -3 | 0 1 1 0 0 |
| 27 | +3 | 1 0 0 1 0 |
| 28 | -2 | 0 1 1 0 1 |
| 29 | +2 | 1 0 0 0 1 |
| 30 | -1 | 0 1 1 1 0 |
| 31 | +1 | 1 0 0 0 0 |
| 32 | 0 | 0 1 1 1 1 |

Fig. 4A

ENCODED DATA FOR GREEK KEY PATTERN

| STITCH NO. | BIGHT POSITION COORDINATE | CODE | FEED INCREMENT | CODE |
|---|---|---|---|---|
| 1 | −15 | 0 0 0 0 0 | 0 | 1 0 0 0 1 |
| 2 | 0 | 0 1 1 1 1 | 0 | 1 0 0 0 1 |
| 3 | +15 | 1 1 1 1 0 | +.100 | 0 0 1 1 1 |
| 4 | +15 | 1 1 1 1 0 | +.100 | 0 0 1 1 1 |
| 5 | +15 | 1 1 1 1 0 | 0 | 1 0 0 0 1 |
| 6 | 0 | 0 1 1 1 1 | −.060 | 1 0 1 1 1 |
| 7 | 0 | 0 1 1 1 1 | 0 | 1 0 0 0 1 |
| 8 | −15 | 0 0 0 0 0 | +.160 | 0 0 0 0 1 |

3,855,956

SEWING MACHINE STITCH PATTERN GENERATION FROM STITCH DATA STORED IN STATIC MEMORY

BACKGROUND OF THE INVENTION

Systems are known in the prior art wherein sewing-machine stitch related information is stored on a record sheet or tape which is moved past a read-out head synchronously with the sewing-machine drive but, so far as we are aware, these systems have not been practically successful due to the large space required for storing the many different patterns necessary in a practical sewing machine and due to the inertia difficulties attendent upon a mechanically moving memory.

SUMMARY OF THE INVENTION

It is therefore an object of this invention to provide a system for generating a predetermined stitch pattern in a sewing machine, which system does not require the use of a mechanically moving memory or information storage device and in which high density of information storage is attainable.

In attaining the objects of the present invention in a preferred embodiment, the stitch pattern information is stored in digital from in a static or solid state memory which may take the form a so called "chip". This information is read out by addressing the memory with the output of a counter which counts up the pulses from a pulse generator driven in timed relation with the sewing machine and so adds one pulse for each stitch made. The memory output is applied to control a driving device operatively connected to impart a controlled range of movement to the conventional stitch forming instrumentality of the sewing machine to produce a specific predetermined position coordinate for the needle penetration during each stitch formation.

BRIEF DESCRIPTION OF THE DRAWINGS

The subject matter which I regard as my invention is particularly pointed out and distinctly claimed in the concluding portion of this specification. My invention, itself, however both as to its organization and method of operation, together with further objects and advantages thereof may best be understood by reference to the following description taken in connection with the accompanying drawings:

FIG. 4A is a table of encoded data for producing a 32 needle penetration ARROWHEAD pattern having changes in the bight coordinate only;

DESCRIPTION OF THE DRAWINGS

Figure 1:
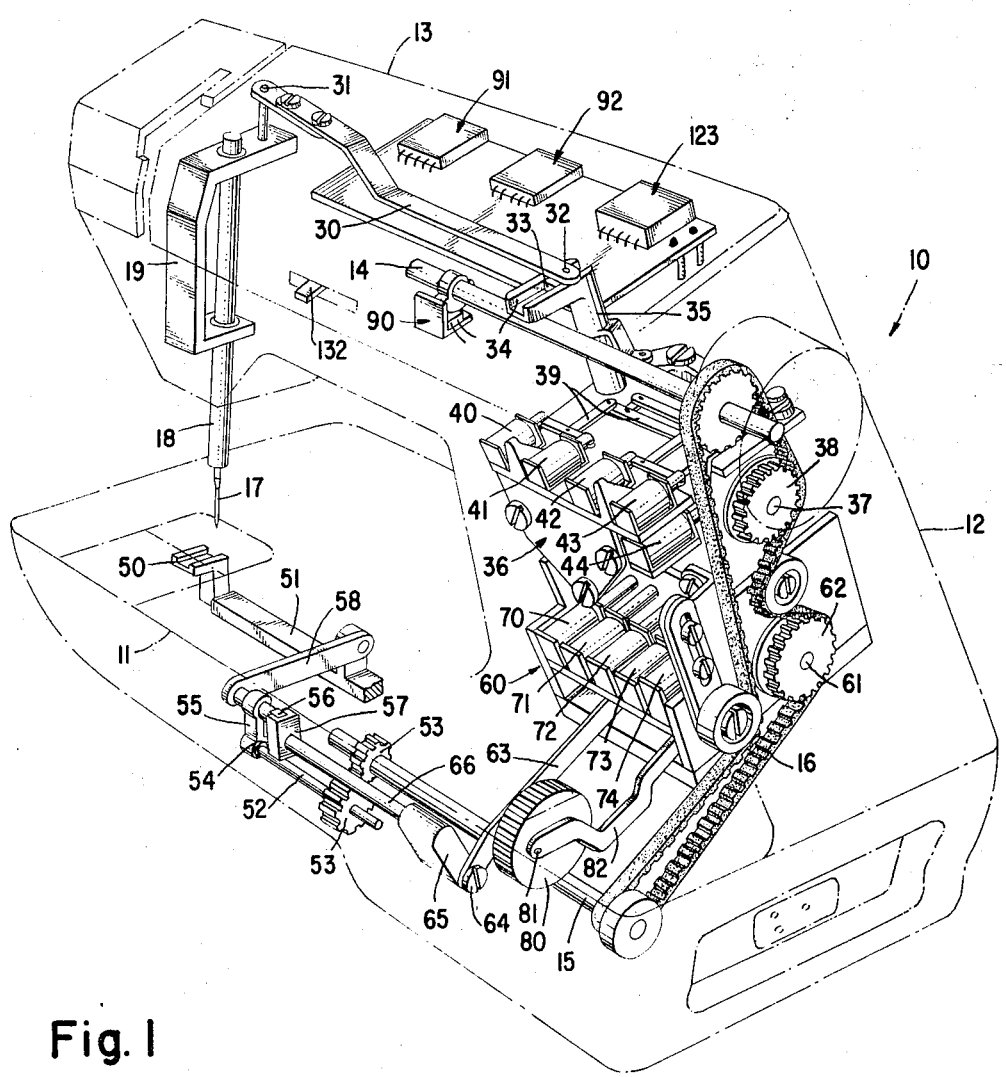
FIG. 1 is a perspective view of a sewing machine including fragments of a typical driving mechanism and of a sewing needle and work feeding mechanism, and illustrating the physical elements necessary to an embodiment of this invention applied thereto.

FIG. 1 of the drawings illustrates a sewing machine with fragments of two mechanisms thereon, the needle and the work feeding mechanism, which can contribute to changes in the relative coordinates of successive needle penetrations. FIG. 1 also includes representation of the salient physical elements necessary to effect stitch patterning in accordance with this invention.

As shown in phantom lines in FIG. 1, the sewing machine casing 10 includes a bed 11, a standard 12 rising from the bed and a bracket arm 13 overhanging the bed. The driving mechanism of the sewing machine includes an armshaft 14 and a bed shaft 15 interconnected by a timing belt 16 in the standard. A needle 17 carried for endwise reciprocation by a needle bar 18 is mounted for lateral jogging movement in a gate 19 in the bracket arm 13. Any conventional connections (not shown) may be used between the armshaft and the needle bar for imparting needle reciprocation. A drive link 30 pivoted at 31 to the gate 19 serves to impart lateral jogging movement to the needle. The drive link 30 is pivoted as at 32 to a block 33 arranged in a radial guide slot 34 of an oscillating driver 35 forming a part of an electromechanical actuator indicated generally at 36 for influencing the lateral needle jogging or bight. One such actuator which may be used with this invention is that shown and described in U.S. Pat. application Ser. No. 347,982 filed Apr. 4, 1973, assigned to the same assignee as the present invention, which is incorporated by reference herein. For an understanding of the present invention it is sufficient to understand that the actuator 36 includes a driveshaft 37 carrying a sprocket 38 engaging the timing belt 16. A whippletree linkage 39 which is connected to the driver 35 is shifted alternately back and forth by the driveshaft 37 and a selected position of the driver within the range of driveshaft imparted motion may be maintained during needle penetration by the selective energization of five solenoids 40,41,42,43 and 44.

Also illustrated in FIG. 1 is a fragment of a work feeding mechanism including a feed dog 50 carried by a feed bar 51. In FIG. 1 a mechanism is illustrated for imparting work transporting movement to the feed dog including a feed driveshaft 52 driven by gears 53 from the bed shaft, a can 54 on the feed driveshaft, a pitman 55 embracing the cam 54 and connected to reciprocate a slide block 56 in a slotted feed regulating guideway 57. A link 58 pivotally connects the pitman 55 with the feed bar 51 so that depending upon the inclination of the guideway 57, the magnitude and direction of the feed stroke of the feed dog will be determined.

The inclination of the guideway 57 in the present invention may be controlled by an electromechanical feed actuator indicated generally at 60. The actuator 60 may also be built in accordance with the U.S. Pat. application Ser. No. 347,982 referred to above, and may include a driveshaft 61 carrying a sprocket 62 engaging the timing belt 16. A whippletree linkage (not shown) which is shifted alternately back and forth by the driveshaft 61 is connected to a link 63 pivoted at 64 to a rock arm 65 carried on a rock shaft 66 secured to the guideway 57. A selected position of the whippletree linkage, and therefore, of the link 63 may be maintained during the active work feeding stroke by the selective energization of five solenoids 70,71,72,73 and 74. A dial 80 on the machine bed is provided with a crank pin 81 embraced by an adjusting link 82 which extends into the feed actuator 60 to provide for a balance control. Preferably the balance control provides for a mechanical fine adjustment between the whippletree linkage connection and the guideway 57 so that the intended stitch length and directions can be accurately attained.

Figure 2:
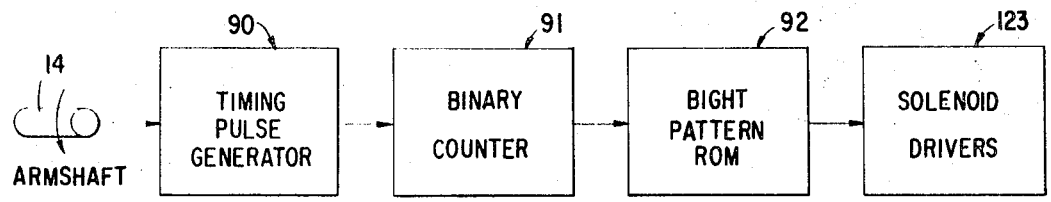
FIG. 2 is a block diagram of a system according to one form of the present invention which provides bight data only.

With reference to FIGS. 1 and 2, the sewing machine armshaft 14 is connected to drive a pulse generator 90 which may preferably be of the type shown and described in U.S. Pat. application Ser. No. 364,836 filed May 29, 1973 and assigned to the same assignee as the present invention, which is incorporated herein by reference. It is sufficient for the purposes of the present invention to note that the pulse generator 90 need only produce a single well defined rectangular pulse for each rotation of the armshaft 14 and may be adjusted to produce this pulse repeatedly in any particular angular position of the armshaft. Thus the pulse may be caused to occur at any desired position of the needle in its reciprocation during each stitch formation.

A binary counter 91 is connected to the pulse generator 90 to count the pulses therefrom. Conveniently, the counter 91 may have a capacity of 5 bits and will count to 31 and reset to zero on the 32nd pulse. Thus a pattern having 32 needle penetrations may be repeated indefinitely without special provision for resetting the counter to zero.

The binary output from counter 91 is applied as address input to an integrated logic circuit memory 92 which is encoded to provide a specific binary output signal for each different address input signal. As will become apparent later, the encoding is such that an actuator such as those indicated at 36 and 60 in FIG. 1 operatively connected to the stitch forming instrumentality and controlled by the memory output establish the coordinates for the needle penetration of each stitch in accordance with the predetermined pattern desired. It is sufficient for the purposes of the present invention to note that the amount of output movement applied to the sewing machine bight and/or feed regulator is controlled by the selective energization of five solenoids of each of the actuators. Preferably the amount of output movement contributed by each solenoid of the actuator is weighted or given significance according to the common binary 8,4,2,1 code. Thus, if each solenoid is driven by the memory output line having the same bit significance as its output movement significance, the binary number stored in the memory is converted by the actuator directly into movement proportional to the decimal equivalent of said binary number.

The above operation will be best understood by reference to FIGS. 3, 4A and 4B and will now be described for the making of one specific pattern. The pattern, in this first example chosen for illustrative purposes only, is the ARROWHEAD pattern and, as shown in FIG. 4B consists of 32 needle penetrations of uniformly decreasing bight on each side of center.

In this first example the feed is not required to be varied in accordance with a pattern. This first example, therefore, can be embodied in a sewing machine fitted with only a bight actuator 36 and a conventional manual feed regulator in place of the feed actuator 60. If a feed actuator 60 is included, this first example might be effected by disabling the feed actuator or by intentionally programming it as will be described later to regulate the feed in a constant setting.

As shown in the table of encoded data in FIG. 4A, there are 15 possible equally-spaced bight positions on each side of center needle. The bight is initially adjusted so that, with no input to the actuator 36 (solenoids), the needle is set at extreme left of center or at coordinate-15. Since the coordinate position for the first stitch is at needle center or coordinate 0, the actuator must shift the bight 15 units to the right. To accomplish this the memory must present a binary number to the solenoids equal to decimal 15 and, in the code chosen, this 01111. The remaining bight code words for each needle position coordinate necessary to produce the ARROWHEAD pattern are derived in the same manner and are shown in the table of FIG. 4A under Code.

Figure 3:
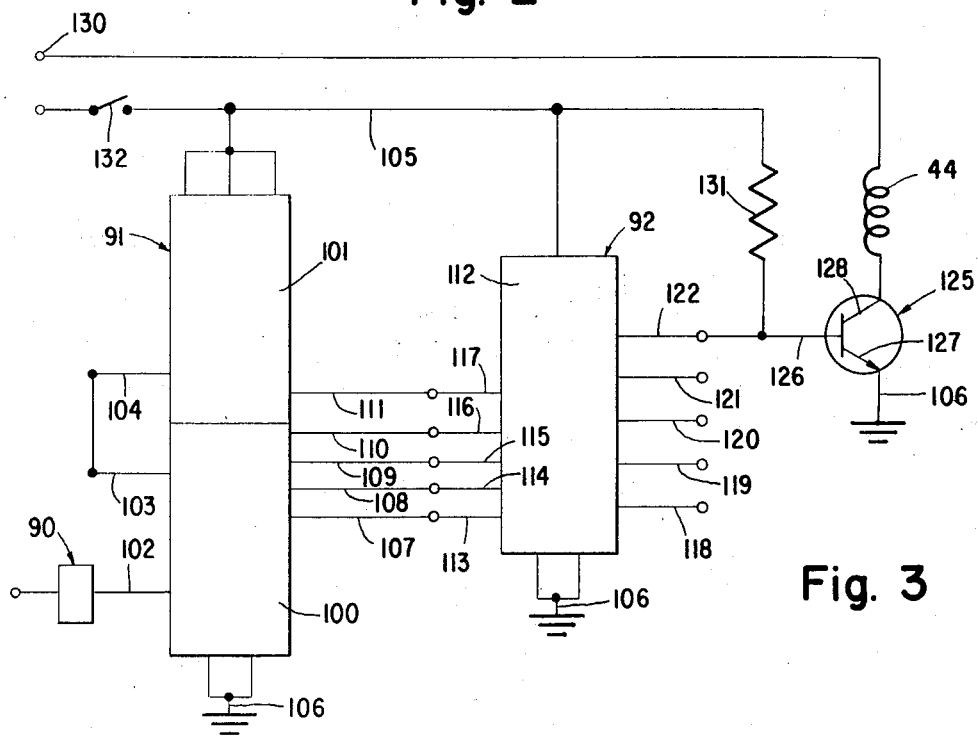
FIG. 3 is a diagrammatic showing of how the system of FIG. 2 may be implemented by conventional integrated logic elements.
Figure 4B:
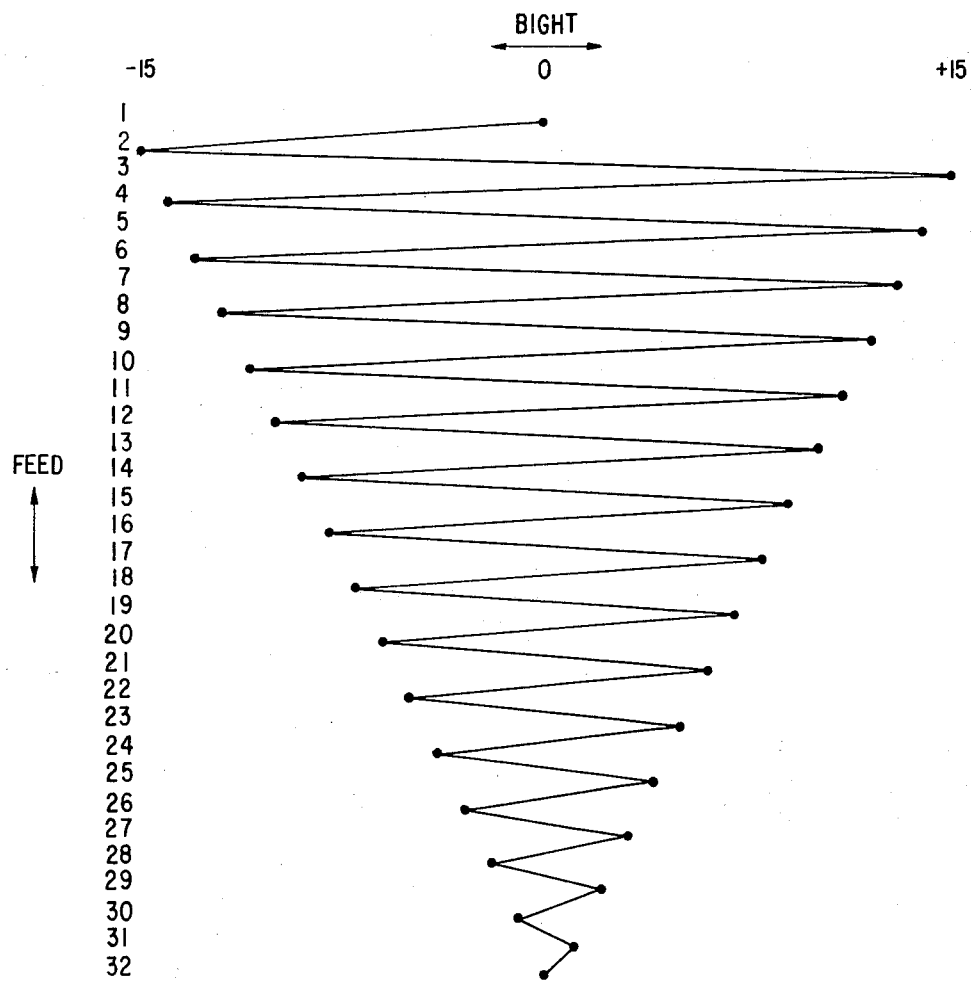
FIG. 4B is a representation of the ARROWHEAD pattern formed from the data illustrated in FIG. 4A.

Referring now to FIG. 3, wherein the block diagram of FIG. 2 is shown as implemented by commercially obtainable integrated circuit logic modules, the binary counter 91 of FIG. 2 is composed of 2 cascaded 4 bit counters 100 and 101, each known as a Signetics N74193 unit. Counter 100 has a count-up input line 102 connected to receive the pulses from the armshaft pulse generator 90 as indicated diagrammatically. A carry-out line 103 from counter 100 is connected to the count-up line 104 of counter 101 to cascade the counters and obtain increased bit capacity. Certain terminals are connected to the high side 105 of a logic power supply, which in this instance may be +5 volts. Other terminals are connected to the gounded side 106 of the power supply, all in conventional manner. The four bit output lines 107, 108, 109 and 110 from counter 100 and the single bit line 111 from counter 101 provide the 5 bit capacity of the cascaded binary counter 91 with line 107 providing the least significant bit (1) and line 111 providing the most significant bit (16).

The memory 94 is implemented by a Signetics 8223 Field programable read only memory 112 which is a read only memory (ROM) having address input lines 113,114,115,116 and 117 and output data lines 118,119,120,121 and 122. The memory units 112 has conventional connections as shown to the high side 105 and grounded side 106 of the logic power supply. The memory unit 112 may be permanently encoded so that any binary member presented on the address lines 113–117 will produce a predetermined specific binary number on output data lines 118 to 122. The table of encoded data of FIG. 4A shows how the memory unit 112 is encoded to produce the ARROWHEAD pattern shown. As the successive pulses from the pulse generator 90 are counted up in sequence, the output data lines 118 to 122 assume a logic 1 or 0 condition in accordance with the data shown in the code row of the table. Actually a logic 1 corresponds to +5 volts and a logic 0 corresponds to ground.

Each output data line is connected to control the drive of a respective one of the solenoids 40 to 44 shown in FIG. 1. For convenience the elements necessary to effect such connections may be housed in a common assembly 123 labeled Solenoid Drivers in FIG. 2. A typical solenoid drive arrangement is shown in FIG. 3 wherein a transistor 125 has its base 126 connected to the data output line 122. The emitter 127 is connected to ground 106 and the collector 128 is connected through solenoid 44 to the positive terminal 130 of a power supply capable of supplying current necessary to energize the solenoids. The base 126 is also connected through resistor 131 to the high side 105 of the logic power supply.

An operator influenced switch 132 may be included in the high side 105 of the logic power supply to disable the electromechanical actuator in which case a condition equivalent to deactivating each of the solenoids 40 to 44 will obtain and a line of straight stitches will result.

The operation of the typical solenoid drive is as follows: When a logic 1 (logic power voltage) appears on line 122, the transistor 125 conducts and supplies current from supply 130 to energize the solenoid 44. However, when line 122 is at logic 0 (grounded), the transistor 125 is cut off and the solenoid 44 is deenergized. Now, if line 122 presents the most significant output bit (16) and solenoid 44 is chosen to produce the most significant output movement, i.e. proportional to this bit significance, the conversion from the output binary data encoded in the memory 92 to movement of the output device controlling the stitch coordinate is directly accomplished. It will be understood that each of the other output data lines 118,119,120 and 121 will be connected through its own drive transistor to solenoids 40,41,42 and 43, respectively, and that each solenoid controls movement of the actuator having the same bit significane as that of the output data line to which it is connected.

In the system above described the new bight data may be applied to the actuator during the time the needle is reciprocated out of the material and in time so that the new needle coordinate position is established for each stitch before the needle penetration next begins and is held fixed throughout the penetration period. This is readily accomplished by adjusting the pulse generator 90 so that the output pulse therefrom can be made to occur during the time the needle is withdrawn from the material. The logic circuits are practically instantaneous in operating speed and the solenoids can be made to have small pick-up and drop-out times so that this adjustment is not critical.

Thus far there has been described as a first example a system for making automatically in a sewing machine a pattern of stitches which requires the storage and recovery of bight information only. There will now be described as a second example a system for making a pattern which requires the storage and recovery of both feed information *and* bight information. It is clear that, by using the second example, both bight and feed information words stored in the memory at the same address will be recovered at the same time. However, it is equally clear that the bight and feed cannot be changed at the same time in the armshaft cycle and, in general, these functions should occur approximately 180° apart in the armshaft cycle.

Figure 5:
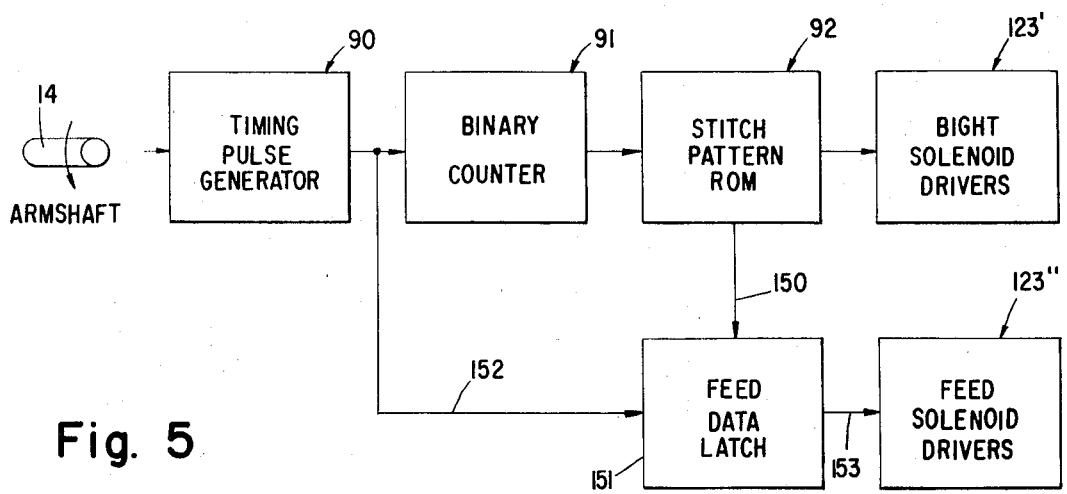
FIG. 5 is a block diagram of a system modified from that of FIG. 1 to provide both bight and feed data for the pattern.

To overcome the difficulty above, and by reference to FIG. 5, a system is described in which the bight information output from the memory is applied *directly* to the solenoids of the bight actuator but the feed information output is held on the input of a latch until the end of the timing pulse (which can be made 180° long), when a latch signal outputs feed information to the solenoids of the feed actuator. In this manner, new bight and feed information recovered from the memory at the same time may be used at the proper and different times in the armshaft cycle as required for each of the actuators.

Referring now to FIG. 5, the pulse generator 90 driven by the armshaft 14 of the sewing machine provides timing pulses which are counted up in the counter 91. The output of the counter 91 is presented as the address input to a static read-only memory 92 in which is stored the bight *and* feed information for the desired stitch pattern. In the system shown in this second example, the memory 92 can store eight words of ten bits each. Five bits of each word are used for bight information and the remaining five bits are used for feed information.

As shown in FIG. 5 the bight information output from the memory is presented *directly* to the solenoid driver 123'for the bight actuator. However, the feed information output from the memory is held on an input line 150 of a latch 151 until a latch signal which is responsive to a pulse such as the end or trailing edge of the timing pulse from the pulse generator 90 appears on a line 152 and transfers this feed information to a latch output line 153 where it is presented to the solenoid drivers 123''of the feed actuator 60. It will be appreciated that with contemporary miniaturization techniques the bight and feed solenoid driver components in drivers 123'and 123''of FIG. 5 may be accomodated in an assembly as illustrated at 123 in FIG. 1.

The feed actuator, of course, may be of the type shown in FIG. 1 and described above.

Figures 6A, 6B:
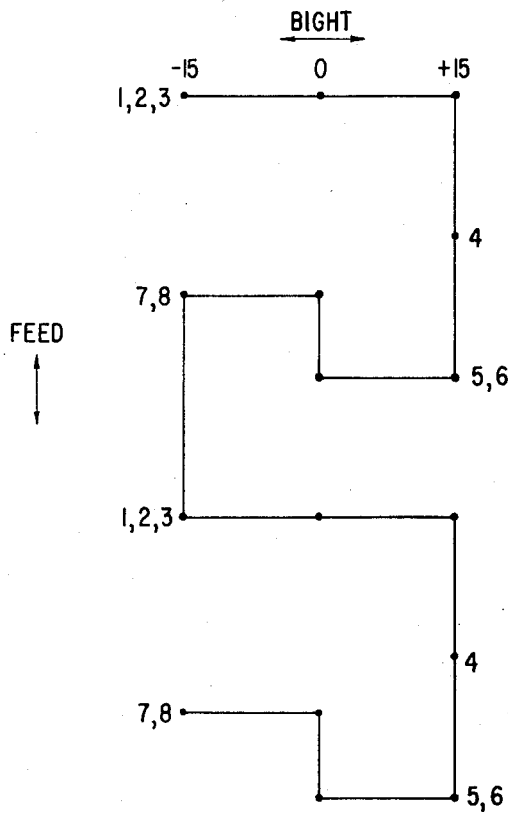
FIG. 6A is a table of encoded data for producing an 8 needle penetration GREEK KEY pattern having changes in both the bight and feed coordinates.
FIG. 6B is a representation of the GREEK KEY pattern formed from the data illustrated in FIG. 6A.

Referring to FIGS. 5, 6A and 6B there will now be described a system for making one specific pattern requiring both bight and feed information. The pattern, chosen for illustrative purposes only, is the GREEK KEY pattern shown in FIG. 6B and the corresponding encoded data is shown in the table of FIG. 6A. The bight code is derived in the same manner as for the ARROWHEAD pattern of FIG. 4A and 4B, that is, there are 15 possible equally-spaced bight positions on each side of needle center and the bight is initially adjusted so that, with no input to the bight driving device, the needle is at extreme left of center or at coordinate −15. It so happens that for the GREEK KEY pattern, the first needle penetration coordinate is at −15, so that the first bight code word, output from the memory 92 is 00000 and the needle remains at coordinate −15. The second needle bight position is at needle center which means that the bight driving device must move the bight 15 units to the right. To accomplish this, the second bight code word output from the memory 92 is 01111 or equal to decimal 15. The remaining bight code words for each needle position coordinate necessary to produce the GREEK KEY pattern are derived in the same manner and are shown in the table of FIG. 6A under Bight Code.

The basis for the Feed Code will now be described. The work feed increment which is required for formation of the illustrated GREEK KEY pattern after needle penetrations 1 and 2 is zero. The feed code word corresponding to zero stitch length may, for instance, be 100001 corresponding to 17 in the base 10, and the balance adjusting dial 80 may be used to provide a fine adjustment insuring that zero feed is attained in response to this actuation of actuator 60. After both stitches 3 and 4 a forward feed step 0.10 inch is required. If the whippletree linkage in the feed actuator 60 is proportioned such that each unit of output from the feed information stored in the memory will result in a feed change of 0.010 inch when applied to the solenoids 70 to 74 of the feed actuator, a feed code word of 00111 corresponding to 7 in the base 10, at stitches 3 and 4 will provide this feed control. By the same token it will be noted that after stitch 6 in the GREEK KEY pattern a negative or reverse feed increment of 0.060 inch is required and this will be generated in response to a code word 10111 corresponding to 23 in the base 10.

In applying the feed code of FIG. 6A to the pattern of FIG. 6B, it will be understood that while the bight code data and the feed code data in the same row appears on the output of the memory at the same time in response to the same timing pulse, the feed increment code data is *held* on the latch input and is not used until *after* the needle penetration corresponding to the bight code data positioned in the same row has occured. This means that, in establishing the coordinates for each needle penetration, the actual feed movement corresponding to the feed data for each stitch is used after the bight data. Thus in the pattern shown, for example, in going from needle position 4 to 5, the feed increment data (+0.100) of row 4 is used between the needle position data of positions 4 and 5.

In the specific examples shown and described above for illustrative purposes only, certain convenient initial conditions are established and certain codes are used, but it will be understood that other initial conditions and codes may be used without departing from the scope of the present invention. For example, the initial condition herein chosen for zero input to the bight actuator is with needle positioned at extreme left of center. Depending on the characteristics of the specific actuator used, it may be more convenient to establish the needle center position as the zero input condition, in which case the specific stitch code would be changed to correspond.

The important and basic rationale of the system of the present invention is (1) the permanent storage in a static memory of coded information related to the positional coordinates for each stitch of a predetermined stitch pattern, (2) the recovery of this information from the memory on a *per stitch* basis by addressing the memory with successive code words derived from a counter which counts up stitch pulses derived from a pulse generator driven in timed relation with the sewing machine and (3) the conversion of the recovered information into controlled movement of the stitch-forming instrumentalities of the sewing machine to produce a specific position coordinate for the penetration for each stitch formation.

While a specific form of actuator or driving device is shown herein for converting the electrical information delivered in accordance with the pattern information stored in the memory into proportional mechanical movement for controlling the bight and feed increment, it will be understood that the present invention is not so limited, but includes within its scope any type of electrical to mechanical adder wherein a coded electrical signal is converted into a proportional mechanical movement.

Having thus set forth the nature of this invention, what is claimed herein is:

1. In a sewing machine having a stitch forming instrumentality variable in position over a predetermined range of positions between successive stitches to produce a pattern of stitches, a driving device operatively connected to impart movement to said stitch forming instrumentality over said predetermined range of positions in response to stitch pattern signals, a pulse generator driven in timed relation with said sewing machine for porducing an effective timing pulse between stitches, a counter responsive to said timing pulses from said pulse generator for producing output control signals in a progressive numerical code, a static memory means for storing data groups capable of being summed every combination of which is unique, means responsive to said progressive numerical code of said control signals for extracting said data groups from said static memory, means for summing each data group extracted from said static memory, and means effective to impress on said driving device a stitch pattern signal corresponding to the summation of each different data group extracted in response to said progressive numerical code of control signals.

2. In a sewing machine according to claim 1 wherein the static memory contains predetermined individual stitch data stored as a code and recoverable individually in a pattern sequence by addressing the memory successively with a repeating series of digital pulses as counted from the pulse generator by the counter.

3. In a sewing machine according to claim 1 wherein the counter supplies the address for the memory as a time series of progressively increasing binary numbers corresponding to the progressively increasing number of stitches in the pattern.

4. In a sewing machine having at least one stitch forming instrumentality variable in position over a predetermined range of possible positions between successive stitches to produce a predetermined pattern of stitches, a driving device operatively connected to impart movement to said stitch forming instrumentality over said predetermined range of positions in response to stitch pattern signals, a pulse generator driven in timed relation with said sewing machine for producing a timing pulse between each successive stitch, a counter responsive to timing pulses from said pulse generator for producing a time series of numerical output signals each increased by one for each successive stitch formed, a static memory receiving said output signals as address inputs and effective to extract corresponding to each address input a data group capable of being summed into at least that number of different unique combinations which is equal to the number of said plurality of possible positions in said predetermined range, and means to impress on said driving device individual predetermined stitch pattern signals each comprising the summation of said data group extracted from said static memory, each individual stitch pattern signal corresponding to a different numerical output signal.

5. In a sewing machine according to claim 4 wherein each address corresponds to a specific numerical output signal from the counter and the memory is encoded to provide an output signal, which, when applied to said driving device, produces a specific position coordinate for the needle penetration during each stitch formation.

6. In a sewing machine having stitch forming instrumentalities variable over a predetermined range between successive stitches to produce a predetermined pattern of stitches including a laterally joggable needle for forming zigzag stitches of variable bight and a work feeding mechanism, driving devices operatively connected to impart movement to said stitch forming instrumentalities over said predetermined range in response to stitch pattern signals, a pulse generator driven in timed relation with said sewing machine for producing a signal pulse between each successive stitch, a counter responsive to signal pulses from said pulse generator for producing a time series of numerical output signals each increased by one for each successive stitch formed, a static memory receiving said output signals as address inputs, and effective to impress on said driving devices individual predetermined stitch pattern signals, each individual stitch pattern signal corresponding to a different numerical output signal, wherein each address corresponds to a specific numerical output signal from the counter, and wherein said static memory stores both bight and feed information for each stitch, which information is recovered simultaneously when the memory is addressed by the output from the counter, and wherein said recovered information is held for later release to the driving devices at times appropriate to their operation.

7. In a sewing machine machine according to claim 6 including a latch, wherein said static memory stores both bight and feed information for each stitch, which information is recovered simultaneously when the memory is addressed by the output from the counter and wherein the feed information recovered is held on the input of said latch until a latch signal responsive to a predetermined pulse from the pulse generator transfers the feed information to the driving device controlling the feed range.

8. In a sewing machine having a stitch forming instrumentality variable in discrete coordinate position over a predetermined range of positions which is greater than two between successive stitches to produce a pattern of stitch positions, a driving device operatively connected to impart movement to said stitch forming instrumentality over said predetermined range of positions in response to stitch pattern signals, a pulse generator driven in timed relation with said sewing machine for producing an effective timing pulse between stitches, a counter responsive to said timing pulses from said pulse generator for producing output control signals in a progressive numerical code, a static memory means for storing data extractable in response to the application of each timing pulse which data is capable of influencing any one discrete coordinate position of said stitch forming instrumentality within said predetermined range of positions, and means effective to impress on said driving device stitch pattern signals corresponding to said data extracted from said static memory in response to said progressive numerical code of control signals.

* * * * *